(12) United States Patent
Kapp et al.

(10) Patent No.: US 8,725,326 B2
(45) Date of Patent: May 13, 2014

(54) SYSTEM AND METHOD FOR PREDICTING A VEHICLE ROUTE USING A ROUTE NETWORK DATABASE

(75) Inventors: Kevin Kapp, Melbourne, FL (US); Eric Vorndran, Melbourne, FL (US); Daniel Pagano, Melbourne, FL (US); Ajith Kuttannair Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/344,331

(22) Filed: Jan. 5, 2012

(65) Prior Publication Data

US 2013/0297199 A1 Nov. 7, 2013

Related U.S. Application Data

(63) Continuation of application No. 12/047,427, filed on Mar. 13, 2008, now Pat. No. 8,126,601, which is a continuation-in-part of application No. 11/765,443, filed on Jun. 19, 2007, now abandoned, which is a continuation-in-part of application No. 11/669,364, filed on Jan. 31, 2007, which is a continuation-in-part of application No. 11/385,354, filed on Mar. 20, 2006.

(60) Provisional application No. 60/894,039, filed on Mar. 9, 2007, provisional application No. 60/939,852, filed on May 24, 2007, provisional application No. 60/849,100, filed on Oct. 2, 2006, provisional application No. 60/850,885, filed on Oct. 10, 2006.

(51) Int. Cl.
*G05D 1/00* (2006.01)
*G05D 3/00* (2006.01)
*G06F 7/00* (2006.01)

(52) U.S. Cl.
USPC ............... 701/20; 701/19; 701/408; 701/410; 701/413; 701/416; 701/417; 701/420; 701/424; 701/442; 701/527

(58) Field of Classification Search
USPC ............ 701/19, 20, 408, 410, 413, 416, 417, 701/420, 424, 442, 527
See application file for complete search history.

(56) References Cited

U.S. PATENT DOCUMENTS

| | | | |
|---|---|---|---|
| 2,104,652 A | 1/1938 | Inman | |
| 2,601,634 A | 6/1952 | Rivette | |

(Continued)

FOREIGN PATENT DOCUMENTS

| | | |
|---|---|---|
| CA | 2 192 151 A | 8/1997 |
| CH | 642 418 | 4/1984 |

(Continued)

OTHER PUBLICATIONS

ISR and WO pertaining to International application No. PCT/US2009/032933 dated Feb. 3, 2009.

(Continued)

*Primary Examiner* — Khoi Tran
*Assistant Examiner* — Jorge Peche
(74) *Attorney, Agent, or Firm* — GE Global Patent Operation; John A. Kramer

(57) ABSTRACT

A system and method for predicting a route to be authorized by a dispatcher for a vehicle to travel on a route network comprises a computer system that has a database having stored data relative to interconnecting route segments that make up the route network. Data relative to the origination location and the destination location is input into the computer system. The processor accesses the database and generates a predicted route with an origination location and destination location.

26 Claims, 3 Drawing Sheets

(56) References Cited

U.S. PATENT DOCUMENTS

| | | | |
|---|---|---|---|
| 2,783,369 A * | 2/1957 | Weber | 246/30 |
| 2,927,711 A | 3/1960 | Naggiar | |
| 3,519,805 A | 7/1970 | Thorne-Booth | |
| 3,650,216 A | 3/1972 | Harwick et al. | |
| 3,655,962 A | 4/1972 | Koch | |
| 3,781,139 A | 12/1973 | Lohse | |
| 3,794,833 A | 2/1974 | Blazek et al. | |
| 3,865,042 A | 2/1975 | DePaola et al. | |
| 3,886,870 A * | 6/1975 | Pelabon | 105/61.5 |
| 3,948,314 A | 4/1976 | Creswick et al. | |
| 4,005,838 A | 2/1977 | Grundy | |
| 4,041,283 A | 8/1977 | Mosier | |
| 4,042,810 A | 8/1977 | Mosher | |
| 4,136,432 A | 1/1979 | Melley, Jr. | |
| 4,181,943 A | 1/1980 | Mercer, Sr. et al. | |
| 4,253,399 A | 3/1981 | Spigarelli | |
| 4,279,395 A | 7/1981 | Boggio et al. | |
| 4,344,364 A | 8/1982 | Nickles et al. | |
| 4,401,035 A | 8/1983 | Spigarelli et al. | |
| 4,548,164 A | 10/1985 | Ylonen et al. | |
| 4,561,057 A | 12/1985 | Haley, Jr. et al. | |
| 4,617,627 A | 10/1986 | Yasunobu et al. | |
| 4,644,705 A | 2/1987 | Saccomani et al. | |
| 4,663,713 A | 5/1987 | Cornell et al. | |
| 4,711,418 A | 12/1987 | Aver, Jr. et al. | |
| 4,735,385 A | 4/1988 | Nickles et al. | |
| 4,794,548 A | 12/1988 | Lynch et al. | |
| 4,827,438 A | 5/1989 | Nickles et al. | |
| 4,843,575 A | 6/1989 | Crane | |
| 4,853,883 A | 8/1989 | Nickles et al. | |
| 5,109,343 A | 4/1992 | Budway | |
| 5,181,541 A | 1/1993 | Bodenheimer | |
| 5,187,945 A | 2/1993 | Dixon | |
| 5,197,627 A | 3/1993 | Disabato et al. | |
| 5,239,472 A | 8/1993 | Long et al. | |
| 5,240,416 A | 8/1993 | Bennington | |
| 5,253,153 A | 10/1993 | Mathews et al. | |
| 5,316,174 A | 5/1994 | Schutz | |
| 5,363,787 A | 11/1994 | Konopasek et al. | |
| 5,388,034 A | 2/1995 | Allen et al. | |
| 5,398,894 A | 3/1995 | Pascoe | |
| 5,437,422 A | 8/1995 | Newman | |
| 5,440,489 A | 8/1995 | Newman | |
| 5,460,013 A | 10/1995 | Thomsen | |
| 5,487,516 A | 1/1996 | Murata et al. | |
| 5,583,769 A | 12/1996 | Saitoh | |
| 5,623,413 A | 4/1997 | Matheson et al. | |
| 5,642,827 A | 7/1997 | Madsen | |
| 5,651,330 A | 7/1997 | Jewett | |
| 5,676,059 A | 10/1997 | Alt | |
| 5,744,707 A | 4/1998 | Kull | |
| 5,755,349 A | 5/1998 | Brundle | |
| 5,758,299 A | 5/1998 | Sandborg et al. | |
| 5,785,392 A | 7/1998 | Hart | |
| 5,794,172 A | 8/1998 | Matheson et al. | |
| 5,803,411 A | 9/1998 | Ackerman et al. | |
| 5,828,979 A | 10/1998 | Polivka et al. | |
| 5,950,967 A | 9/1999 | Montgomery | |
| 5,957,571 A | 9/1999 | Koster et al. | |
| 5,998,915 A | 12/1999 | Scholz et al. | |
| 6,092,021 A | 7/2000 | Ehlbeck et al. | |
| 6,112,142 A | 8/2000 | Shockley et al. | |
| 6,123,111 A | 9/2000 | Nathan et al. | |
| 6,125,311 A | 9/2000 | Lo | |
| 6,129,025 A | 10/2000 | Minakami et al. | |
| 6,135,396 A | 10/2000 | Whitfield et al. | |
| 6,144,901 A * | 11/2000 | Nickles et al. | 701/19 |
| 6,198,993 B1 | 3/2001 | Higashi et al. | |
| 6,216,957 B1 | 4/2001 | Turunen, Jr. | |
| 6,230,668 B1 | 5/2001 | Marsh et al. | |
| 6,243,694 B1 | 6/2001 | Bonissone et al. | |
| 6,263,266 B1 | 7/2001 | Hawthorne | |
| 6,269,034 B1 | 7/2001 | Shibuya | |
| 6,270,040 B1 | 8/2001 | Katzer | |
| 6,308,117 B1 | 10/2001 | Ryland et al. | |
| 6,325,050 B1 | 12/2001 | Gallagher et al. | |
| 6,332,106 B1 | 12/2001 | Hawthorne et al. | |
| 6,363,331 B1 | 3/2002 | Kyrtsos | |
| 6,380,639 B1 * | 4/2002 | Soucy | 290/40 B |
| 6,404,129 B1 | 6/2002 | Hendricx et al. | |
| 6,434,452 B1 | 8/2002 | Gray | |
| 6,459,964 B1 | 10/2002 | Vu et al. | |
| 6,487,488 B1 | 11/2002 | Peterson, Jr. et al. | |
| 6,501,393 B1 | 12/2002 | Richards et al. | |
| 6,505,103 B1 | 1/2003 | Howell et al. | |
| 6,516,727 B2 | 2/2003 | Kraft | |
| 6,520,124 B2 | 2/2003 | Bohm, II | |
| 6,549,803 B1 | 4/2003 | Raghavan et al. | |
| 6,591,263 B1 * | 7/2003 | Becker et al. | 1/1 |
| 6,591,758 B2 | 7/2003 | Kumar | |
| 6,609,049 B1 | 8/2003 | Kane et al. | |
| 6,612,245 B2 | 9/2003 | Kumar et al. | |
| 6,612,246 B2 | 9/2003 | Kumar | |
| 6,615,118 B2 | 9/2003 | Kumar | |
| 6,647,328 B2 | 11/2003 | Walker | |
| 6,676,089 B1 | 1/2004 | Katzer | |
| 6,691,957 B2 | 2/2004 | Hess, Jr. et al. | |
| 6,694,231 B1 | 2/2004 | Rezk | |
| 6,698,913 B2 | 3/2004 | Yamamoto | |
| 6,702,235 B2 | 3/2004 | Katzer | |
| 6,732,023 B2 * | 5/2004 | Sugita et al. | 701/19 |
| 6,763,291 B1 | 7/2004 | Houpt et al. | |
| 6,789,005 B2 | 9/2004 | Hawthrone | |
| 6,810,312 B2 | 10/2004 | Jammu et al. | |
| 6,812,888 B2 * | 11/2004 | Drury et al. | 342/357.31 |
| 6,824,110 B2 | 11/2004 | Kane et al. | |
| 6,845,953 B2 | 1/2005 | Kane et al. | |
| 6,853,888 B2 | 2/2005 | Kane et al. | |
| 6,856,865 B2 * | 2/2005 | Hawthorne | 701/19 |
| 6,863,246 B2 | 3/2005 | Kane et al. | |
| 6,865,454 B2 | 3/2005 | Kane et al. | |
| 6,873,888 B2 | 3/2005 | Kumar | |
| 6,903,658 B2 | 6/2005 | Kane et al. | |
| 6,910,792 B2 | 6/2005 | Takada et al. | |
| 6,915,191 B2 | 7/2005 | Kane et al. | |
| 6,922,619 B2 | 7/2005 | Baig et al. | |
| 6,948,837 B2 | 9/2005 | Suzuki | |
| 6,953,272 B2 | 10/2005 | Hayakawa et al. | |
| 6,957,131 B2 | 10/2005 | Kane et al. | |
| 6,973,947 B2 | 12/2005 | Penaloza et al. | |
| 6,978,195 B2 | 12/2005 | Kane et al. | |
| 6,980,894 B1 | 12/2005 | Gordon et al. | |
| 6,996,461 B2 | 2/2006 | Kane et al. | |
| 7,021,588 B2 | 4/2006 | Hess, Jr. et al. | |
| 7,021,589 B2 | 4/2006 | Hess, Jr. et al. | |
| 7,024,289 B2 | 4/2006 | Kane et al. | |
| 7,036,774 B2 | 5/2006 | Kane et al. | |
| 7,047,130 B2 * | 5/2006 | Watanabe et al. | 701/420 |
| 7,072,747 B2 | 7/2006 | Armbruster et al. | |
| 7,072,757 B2 | 7/2006 | Adams et al. | |
| 7,073,753 B2 | 7/2006 | Root et al. | |
| 7,079,926 B2 | 7/2006 | Kane et al. | |
| 7,092,800 B2 * | 8/2006 | Kane et al. | 701/19 |
| 7,092,801 B2 * | 8/2006 | Kane et al. | 701/19 |
| 7,092,894 B1 | 8/2006 | Crone | |
| 7,096,171 B2 | 8/2006 | Hawthorne et al. | |
| 7,127,336 B2 | 10/2006 | Houpt et al. | |
| 7,131,403 B1 | 11/2006 | Banga et al. | |
| 7,164,975 B2 | 1/2007 | Bidaud | |
| 7,222,083 B2 | 5/2007 | Matheson et al. | |
| 7,302,895 B2 | 12/2007 | Kumar et al. | |
| 7,340,328 B2 | 3/2008 | Matheson et al. | |
| 7,343,314 B2 | 3/2008 | Matheson et al. | |
| 7,347,168 B2 | 3/2008 | Reckels et al. | |
| 7,349,797 B2 | 3/2008 | Donnelly et al. | |
| 7,497,201 B2 | 3/2009 | Hollenbeck | |
| 7,500,436 B2 | 3/2009 | Kumar et al. | |
| 7,509,193 B2 | 3/2009 | Kustosch | |
| 7,522,990 B2 | 4/2009 | Daum et al. | |
| 7,539,624 B2 | 5/2009 | Matheson et al. | |
| 7,558,740 B2 | 7/2009 | Matheson et al. | |
| 7,618,011 B2 | 11/2009 | Oleski et al. | |
| 7,667,611 B2 | 2/2010 | Lindsey et al. | |
| 7,822,491 B2 | 10/2010 | Howlett et al. | |

(56) References Cited

U.S. PATENT DOCUMENTS

| | | |
|---|---|---|
| 2001/0029411 A1 | 10/2001 | Hawthorne |
| 2001/0047241 A1 | 11/2001 | Khavakh et al. |
| 2002/0059075 A1 | 5/2002 | Schick et al. |
| 2002/0072833 A1 | 6/2002 | Gray |
| 2002/0093201 A1 | 7/2002 | Soucy |
| 2002/0096081 A1 | 7/2002 | Kraft |
| 2002/0107618 A1 | 8/2002 | Deguchi et al. |
| 2002/0174653 A1 | 11/2002 | Uzkan |
| 2003/0001050 A1 | 1/2003 | Katzer |
| 2003/0034423 A1 | 2/2003 | Hess, Jr. et al. |
| 2003/0076221 A1 | 4/2003 | Akiyama et al. |
| 2003/0091017 A1 | 5/2003 | Davenport et al. |
| 2003/0104899 A1 | 6/2003 | Keller |
| 2003/0105561 A1 | 6/2003 | Nickles et al. |
| 2003/0120400 A1 | 6/2003 | Ahmed Baig et al. |
| 2003/0183729 A1 | 10/2003 | Root et al. |
| 2003/0213875 A1 | 11/2003 | Hess et al. |
| 2003/0222981 A1 | 12/2003 | Kisak et al. |
| 2003/0229446 A1 | 12/2003 | Boscamp et al. |
| 2003/0233959 A1 | 12/2003 | Kumar |
| 2003/0236598 A1 | 12/2003 | Villarreal Antelo et al. |
| 2004/0010432 A1 | 1/2004 | Matheson et al. |
| 2004/0034556 A1 | 2/2004 | Matheson et al. |
| 2004/0068359 A1 | 4/2004 | Neiss et al. |
| 2004/0093245 A1 | 5/2004 | Matheson et al. |
| 2004/0098142 A1 | 5/2004 | Warren et al. |
| 2004/0104312 A1 | 6/2004 | Hess, Jr. et al. |
| 2004/0108814 A1 | 6/2004 | Tsuda et al. |
| 2004/0111309 A1 | 6/2004 | Matheson et al. |
| 2004/0122569 A1 | 6/2004 | Bidaud |
| 2004/0129289 A1 | 7/2004 | Hafemann |
| 2004/0133315 A1* | 7/2004 | Kumar et al. ................. 700/302 |
| 2004/0172175 A1 | 9/2004 | Julich et al. |
| 2004/0174121 A1 | 9/2004 | Tsuda et al. |
| 2004/0245410 A1 | 12/2004 | Kisak et al. |
| 2005/0007020 A1 | 1/2005 | Tsuda et al. |
| 2005/0055287 A1 | 3/2005 | Schmidtberg et al. |
| 2005/0065674 A1 | 3/2005 | Houpt et al. |
| 2005/0085961 A1 | 4/2005 | Kane et al. |
| 2005/0109882 A1 | 5/2005 | Armbruster et al. |
| 2005/0120904 A1* | 6/2005 | Kumar et al. ................... 105/35 |
| 2005/0121005 A1 | 6/2005 | Edwards et al. |
| 2005/0171655 A1 | 8/2005 | Flynn et al. |
| 2005/0171657 A1 | 8/2005 | Kumar |
| 2005/0188745 A1 | 9/2005 | Staphanos et al. |
| 2005/0196737 A1 | 9/2005 | Mann |
| 2005/0205719 A1 | 9/2005 | Hendrickson et al. |
| 2005/0234757 A1* | 10/2005 | Matheson et al. ................. 705/8 |
| 2005/0251299 A1 | 11/2005 | Donnelly et al. |
| 2005/0288832 A1 | 12/2005 | Smith et al. |
| 2006/0041341 A1 | 2/2006 | Kane et al. |
| 2006/0047379 A1 | 3/2006 | Schullian et al. |
| 2006/0060345 A1 | 3/2006 | Flik et al. |
| 2006/0085103 A1 | 4/2006 | Smith et al. |
| 2006/0085363 A1 | 4/2006 | Cheng et al. |
| 2006/0086546 A1* | 4/2006 | Hu et al. ...................... 180/65.2 |
| 2006/0116789 A1 | 6/2006 | Subramanian et al. |
| 2006/0116795 A1 | 6/2006 | Abe et al. |
| 2006/0122737 A1 | 6/2006 | Tani et al. |
| 2006/0155434 A1 | 7/2006 | Kane et al. |
| 2006/0162973 A1 | 7/2006 | Harris et al. |
| 2006/0212188 A1 | 9/2006 | Kickbusch et al. |
| 2006/0212189 A1* | 9/2006 | Kickbusch et al. ............. 701/19 |
| 2006/0277906 A1 | 12/2006 | Burk et al. |
| 2006/0282199 A1 | 12/2006 | Daum et al. |
| 2007/0061053 A1 | 3/2007 | Zeitzew |
| 2007/0108308 A1* | 5/2007 | Keightley ...................... 238/29 |
| 2007/0112475 A1 | 5/2007 | Koebler et al. |
| 2007/0219680 A1 | 9/2007 | Kumar et al. |
| 2007/0219681 A1 | 9/2007 | Kumar et al. |
| 2007/0219683 A1 | 9/2007 | Daum et al. |
| 2007/0233364 A1 | 10/2007 | Kumar |
| 2007/0260369 A1 | 11/2007 | Philp et al. |
| 2007/0261648 A1 | 11/2007 | Reckels et al. |
| 2008/0004721 A1 | 1/2008 | Huff et al. |
| 2008/0128563 A1 | 6/2008 | Kumar et al. |
| 2008/0147256 A1 | 6/2008 | Liberatore |
| 2008/0208393 A1 | 8/2008 | Schricker |
| 2009/0044530 A1* | 2/2009 | Gallagher et al. ........... 60/605.1 |
| 2009/0063045 A1 | 3/2009 | Figueroa et al. |
| 2009/0140574 A1 | 6/2009 | Gorman et al. |
| 2009/0177345 A1 | 7/2009 | Severinsky et al. |
| 2009/0248220 A1* | 10/2009 | Ecton et al. ....................... 701/2 |
| 2009/0254239 A1 | 10/2009 | Daum et al. |
| 2009/0319092 A1 | 12/2009 | Piche |
| 2010/0152998 A1 | 6/2010 | Schwarzmann |
| 2011/0035138 A1* | 2/2011 | Kickbusch et al. ........... 701/118 |

FOREIGN PATENT DOCUMENTS

| | | | |
|---|---|---|---|
| DE | 1 605 862 A | 5/1971 | |
| DE | 129 761 A | 2/1978 | |
| DE | 208 324 A | 5/1984 | |
| DE | 255 132 A | 3/1988 | |
| DE | 196 45 426 | 5/1997 | |
| DE | 197 26 542 | 11/1998 | |
| DE | 198 30 353 | 2/2001 | |
| DE | 199 35 349 | 2/2001 | |
| DE | 199 35 352 | 2/2001 | |
| DE | 199 35 353 | 2/2001 | |
| DE | 100 45 921 | 3/2002 | |
| EP | 0 114 633 | 8/1984 | |
| EP | 0 257 662 | 3/1988 | |
| EP | 0 341 826 A | 11/1989 | |
| EP | 0 594 226 | 9/1990 | |
| EP | 0 428 113 | 11/1990 | |
| EP | 467 377 B | 1/1992 | |
| EP | 0 485 978 | 5/1992 | |
| EP | 0 539 885 | 5/1993 | |
| EP | 0 554 983 | 8/1993 | |
| EP | 755 840 A | 1/1997 | |
| EP | 0 958 987 | 11/1999 | |
| EP | 1012019 | 6/2000 | |
| EP | 1 136 969 | 7/2002 | |
| EP | 1 293 948 A | 3/2003 | |
| EP | 1 297 982 | 4/2003 | |
| EP | 1297982 A2 * | 4/2003 | ............... B60K 6/04 |
| EP | 1 466 803 | 10/2004 | |
| EP | 1 564 395 | 8/2005 | |
| EP | 1564395 | 8/2005 | |
| EP | 1 253 059 | 8/2006 | |
| EP | 1697196 | 9/2006 | |
| EP | 1 816 332 | 8/2007 | |
| FR | 2 129 215 | 10/1972 | |
| FR | 2 558 806 | 1/1984 | |
| FR | 2 767 770 | 9/1997 | |
| GB | 482 625 | 12/1936 | |
| GB | 1 321 053 A | 6/1973 | |
| GB | 1 321 054 A | 6/1973 | |
| GB | 2 188 464 A | 9/1987 | |
| JP | 60 028153 | 2/1985 | |
| JP | 03213459 A2 | 9/1991 | |
| JP | 05077734 | 3/1993 | |
| JP | 50-32733 | 9/1993 | |
| JP | 06-108869 | 4/1994 | |
| JP | 06153327 | 5/1994 | |
| JP | 08198102 A2 | 8/1996 | |
| JP | 09076913 | 3/1997 | |
| JP | 10-505036 | 5/1998 | |
| JP | 2001-065360 | 3/2001 | |
| JP | 2005002802 A2 | 1/2005 | |
| JP | 2005-232990 | 9/2005 | |
| JP | 2005-343294 | 12/2005 | |
| JP | 2006-320139 | 11/2006 | |
| JP | 2006-327551 | 12/2006 | |
| JP | 2008535871 | 9/2008 | |
| JP | 5061347 | 10/2012 | |
| WO | 9003622 | 4/1990 | |
| WO | WO 95/25053 | 9/1995 | |
| WO | 9606766 | 9/1996 | |
| WO | WO 99/14093 | 3/1999 | |
| WO | WO9914090 | 3/1999 | |
| WO | WO 03/097424 | 11/2003 | |
| WO | WO 2004/023517 | 3/2004 | |

(56) References Cited

FOREIGN PATENT DOCUMENTS

| WO | WO 2004/051699 | 6/2004 |
|----|----------------|--------|
| WO | WO 2004/052755 | 6/2004 |
| WO | WO 2004/059446 | 7/2004 |
| WO | WO 2004/051700 | 7/2005 |
| WO | WO 2005/061300 | 7/2005 |
| WO | 2006/049252 | 11/2006 |
| WO | WO 2007/027130 | 3/2007 |
| WO | WO 2007/091270 | 8/2007 |
| WO | 2007111768 A2 | 10/2007 |

OTHER PUBLICATIONS

Salasoo, Lembit, "Heavy vehicle systems optimization program: FY 2004 Annual Report".
DOE, "21st Century Locomotive Technology-Quarterly Technical Status Report 6".
DOE, "21st Century Locomotive Technology, Quarterly Technical Status Report 11".
King, Robert D., "DOE heavy vehicle systems optimization (peer review): 21st Century Locomotive Technology".
Razouqi et al. RYNSORD: A Novel, Decentralized Algorithm for Railway Networks with 'Soft Reservation', VTC, 1998, pp. 1585-2589, V3, New York, NY.
ISR and WO pertaining to International application No. PCT/US2009/032933 dated Nov. 3, 2009.
Chang et al. "Cycle Detection in Repair-Based Railway Scheduling System", Robotics and Automation, 1996 pp. 2517-2522, V3, New York, NY.
Grabs, Ulrike, "Modification of Electronic Interlocking EI S in Service", Signal + Draht, Telzlaff Verlag GmbH, 1995, pp. 254-258, V87(07/08), Darmstadt, DE.
Cheng, Yu, "Hybrid Simulation for Resolving Resource conflicts in Train Traffic Rescheduling", Computers in Industry, 1998, pp. 233-246, V35(3), Amsterdam, NL.
ISR and WO pertaining to International application No. PCT US2006/032893 dated Aug. 24, 2006.
ISR and WO pertaining to International application No. PCT/US2007/001428 dated Jan. 18, 2007.
ISR and WO pertaining to International application No. PCT/US2007/066697 dated Apr. 16, 2007.
ISR and WO pertaining to International application No. PCT/US2007/076699 dated Aug. 24, 2007.
ISR and WO pertaining to International application No. PCT/US2007/078001 dated Sep. 10, 2007.
ISR and WO pertaining to International application No. PCT/US2007/078016 dated Sep. 10, 2007.
ISR and WO pertaining to International application No. PCT/US2007/078118 dated Sep. 11, 2007.
ISR and WO pertaining to International application No. PCT/US2007/078340 dated Sep. 13, 2007.
ISR and WO pertaining to International application No. PCT/US2008/063193 dated May 9, 2008.
ISR and WO pertaining to International application No. PCT/US2008/083526 dated Nov. 14, 2008.
ISR and WO pertaining to International application No. PCT/US2009/031740 dated Jan. 23, 2009.
ISR and WO pertaining to International application No. PCT/US2009/037293 dated Mar. 16, 2009.
ISR and WO pertaining to International application No. PCT/US2009/045004 dated May 22, 2009.
ISR pertaining to International application No. PCT/US2010/035058 dated May 17, 2010.
ISR pertaining to International application No. PCT/US2010/047251 dated Aug. 31, 2010.

* cited by examiner

SYSTEM AND METHOD FOR PREDICTING A VEHICLE ROUTE USING A ROUTE NETWORK DATABASE

CROSS-REFERENCE TO RELATED APPLICATIONS

This application is a continuation of U.S. patent application Ser. No. 12/047,427, which was filed on 13 Mar. 2008 (the "'427 application"). The '427 application claims priority to and is a continuation-in-part of U.S. patent application Ser. No. 11/765,443, which was filed on 19 Jun. 2007 (the "'443 application"). The '443 application claims priority to U.S. Provisional Application No. 60/894,039, filed on 9 Mar. 2007 (the "'039 Application"), and to U.S. Provisional Application No. 60/939,852 (the "'852 Application"), filed 24 May 2007. The '443 application also claims priority to and is a continuation-in-part of U.S. patent application Ser. No. 11/669,364, which was filed on 31 Jan. 2007 (the "'364 application"). The '364 application claims priority to U.S. Provisional Application No. 60/849,100, filed 2 Oct. 2006 (the "'100 Application"), and U.S. Provisional Application No. 60/850,885, filed 10 Oct. 2006 (the "'885 Application"). The '364 application also claims priority to and is a continuation-in-part of U.S. patent application Ser. No. 11/385,354, which was filed on 20 Mar. 2006 (the "'354 application"). The entirety of each of these applications (e.g., the '427 application, the '443 application, the '039 Application, the '852 Application, the '364 application, the '100 Application, the '885 Application, and the '354 application) is incorporated by reference.

BACKGROUND

One or more embodiments of the inventive subject matter described herein relate to a powered system, such as a train, an off-highway vehicle, a marine, a transport vehicle, or an agriculture vehicle, such as a method and/or computer software code for improved fuel efficiency, emission output, vehicle performance, infrastructure, and/or environment mission performance of the powered system. Additionally, the presently described inventive subject matter relates to systems or methods that are used to determine a route a vehicle is to follow on a road, track, or route network. At least one embodiment, relates to systems or methods that utilize data relative to a route networks to predict, and if necessary adapt, a predicted route to optimize fuel efficiency during a planned trip or mission of the vehicle.

Some powered systems such as, but not limited to, off-highway vehicles, marine diesel powered propulsion plants, transport vehicles such as transport buses, agricultural vehicles, and rail vehicle systems or trains, typically are powered by one or more power units, such as diesel-fueled power generating units. With respect to rail vehicle systems, a power or powered unit is usually a part of or represents at least one locomotive powered by at least one internal combustion engine (e.g., a diesel engine) and the rail vehicle system further includes a plurality of non-powered units, such as rail cars (e.g., freight cars). More than one powered unit can be provided where the powered units are considered part of a consist.

An operator is usually aboard a powered unit to insure the proper operation of the powered unit, and when there is a consist of the powered units, the operator is usually aboard a lead powered unit. A powered unit consist is a group of powered units that operate together in operating (e.g., propelling) a vehicle, such as a rail vehicle, that includes the powered unit. In addition to ensuring proper operations of the powered unit or powered unit consist, the operator also is responsible for determining operating speeds of the vehicle and forces within the vehicle that the powered units are part of. To perform this function, the operator generally has experience with operating the powered unit and various vehicles over the specified terrain. This knowledge is used to comply with prescribeable operating parameters, such as speeds, emissions, and the like, that may vary with the location of the vehicle along a route. Moreover, the operator can be responsible for assuring in-vehicle forces (e.g., coupling forces between neighboring cars and/or locomotives in a train) remain within acceptable limits.

In marine applications, an operator can be aboard a marine vehicle to insure the proper operation of the vessel, and when there is a vessel consist, the lead operator may be aboard a lead vessel. As with the example described above, a vessel consist can include a group of vessels that operate together in operating a combined mission or trip. In addition to ensuring proper operations of the vessel, or vessel consist, the lead operator can be responsible for determining operating speeds of the consist and forces within the consist of which the vessels are part. To perform this function, the operator has experience with operating the vessel and various consists over the specified waterway or mission. This knowledge is used to comply with prescribeable operating speeds and other mission or trip parameters that may vary with the vessel location along the mission. Moreover, the operator is may ensure mission forces (e.g., forces between the vessels) and location remain within acceptable limits.

In the case of multiple diesel power powered systems, which by way of example and limitation, may reside on a single vessel, power plant, vehicle, or power plant sets, an operator may be in command of the overall system to ensure the proper operation of the system, and when there is a system consist, the operator may be onboard a lead system. Defined generally, a system consist includes a group of powered systems that operate together in meeting a mission. In addition to ensuring proper operations of the single system, or system consist, the operator can be responsible for determining operating parameters of the system set and forces within the set of which the system is a part. To perform this function, the operator can have experience with operating the system and various sets over the specified space and mission. This knowledge is used to comply with prescribeable operating parameters and speeds that may vary with the system set location along the route. Moreover, the operator can be responsible for ensuring that in-set forces (e.g., forces between different components of the set) remain within acceptable limits.

However, with respect to a powered unit (e.g., a locomotive), even with knowledge to assure safe operation, the operator may be unable to operate the powered unit so that the fuel consumption is minimized or reduced for each trip. For example, other factors that must be considered may include emission output, environmental conditions (e.g., noise/vibration, a weighted combination of fuel consumption and emissions output, and the like). This can be difficult to do since, as an example, the size and loading of vehicles can vary, powered units and the associated fuel/emissions characteristics can be different, and/or weather and traffic conditions can vary over the course of a trip.

A vehicle owner may own a plurality of vehicles (e.g., trains) where the vehicles operate over a network of routes (e.g., railroad tracks). Because of the integration of multiple vehicles running concurrently within the network of such routes, scheduling issues may be considered with respect to vehicle operations, the owners could benefit from a way to improve fuel efficiency and emission output so as to save on overall fuel consumption while reducing emission output of multiple vehicles while meeting time constraints on the mission or trip.

Likewise, owners and/or operators of off-highway vehicles, transportation vehicles, agricultural vehicles, marine powered propulsion plants, and/or stationary diesel powered systems may realize financial benefits when such powered systems have increased fuel efficiency, reduced emission output, improved fleet efficiency, and/or improved mission parameter performance so as to save on overall fuel consumption while reducing emission output and meeting operating constraints, such as but not limited to mission or trip time constraints.

Transportation networks (e.g., railways) are relatively complex systems that can include an extensive network of routes (e.g., railroad tracks) having multiple vehicles concurrently operating or traveling on the routes at any given time. The transportation network can be divided into multiple regions with a dispatcher assigned to monitor the movement of vehicles in a respective region of the network. When an operator (e.g., engineer) on a vehicle (e.g., train) is ready operate and move a vehicle on a transportation network, the engineer can call the dispatcher and identify the vehicle to announce the vehicle is prepared to start. Taking into account various factors such as network routing rules, origin and/or destination of the vehicle, speed restrictions and maintenance locations, and the like, the dispatcher develops a route that is divided into multiple route segments.

Usually, the route segments are generated in about fifteen to thirty mile increments. Signals from the dispatch center are transmitted to route field equipment such as signal lights, switches, etc. The field equipment is activated to essentially define a segment of the route the vehicle is following. For example, switches may be activated to move the vehicle to another route, or signals may be generated that are representative of the route that the vehicle is traveling on and/or the speed limit for one or more sections of the route. In response to the field equipment signals and/or in response to verbal commands of the dispatcher, the engineer or operator of the vehicle can control the speed of the vehicle on the route.

The engineer or operator may be concerned with the speed that the vehicle is traveling on the route and arriving at the destination at a desired (e.g., scheduled) time. During the course of the trip, an engineer or operator may make decisions to either slow the vehicle, or increase the power output or speed of the vehicle. Some of these decisions may be dictated solely on the engineer or operator seeing that the vehicle arrives at its destination on time. Accordingly, these decisions may compromise fuel consumption of the vehicle and powered units of the vehicle.

Some railroads have incorporated at dispatch stations movement planner systems for controlling the movement of a plurality of rail vehicles on a track network. Dispatch stations may use these systems to configure segments of a train route. As described above, only segments of the entire route are communicated to the track field equipment, responsive to which the engineer manually or a train controller automatically controls the speed of the train.

Presently, there is no known system or method disposed onboard a powered unit of a vehicle or on the vehicle for predicting an entire route of the vehicle from an origin (e.g., scheduled departure location or a current location on route to a destination location) to a destination (e.g., a final location of a trip or an intermediate location on the way to the final location of the trip). Additionally, there is no known system or method that considers the existing rules of the routes to be traveled on and/or other factors in predicting a route of the vehicle to a destination. Moreover, there is no known system or method that predicts a route of a vehicle (which may involve considering the existing rules of the route) to develop a fuel efficient throttle position strategy for travel of the vehicle from origin to destination.

BRIEF DESCRIPTION

The presently described inventive subject matter describes a system that is onboard a vehicle and is used for predicting a route to be traveled by the vehicle using a route network database. A computer system, having a memory, is linked to one or more vehicles in a fleet of vehicles that follow one or more routes in a route network and the routes are determined by one or more dispatchers. In an embodiment, the computer system may be onboard the vehicle. A database is stored in the memory and comprises data representative of information of the route network including a series of interconnected route segments and a set of routing rules followed by the dispatcher for determining an authorized route the vehicle shall follow. The routing rules include speed restrictions for each route segment. In an embodiment used with trains and locomotives, the database may include a track network made of interconnecting track segments and locations of stations in the track network and the track segments at the stations for entering and exiting a station.

An input mechanism may be provided for inputting data representative of an origination location of the vehicle and one or more destinations of the vehicle. In addition, temporary speed restrictions and route maintenance schedules are entered. A processor in the computer system can be programmed with a route generation algorithm to take the data representative of the origination location and destination location of the vehicle, and access the database to generate a predicted route that is a prediction of a route that a dispatcher may authorize according to the set of routing rules for the vehicle to follow from the origination location to the destination location. In one embodiment, a predicted route may include the identification of each route segment the vehicle is to travel on and the speed at which vehicle is to travel for each route segment.

In one embodiment, the processor is configured to change the predicted route if the vehicle diverges onto an off-route segment. Data representative of the authorized route the vehicle is following, or data representative of route segments the vehicle will follow, is received by the processor to change the predicted route to an alternate predicted route in the event the vehicle diverges or will diverge from a route segment on the predicted route to an off-route segment, the alternate predicted route defined by a starting location, which is the off-route segment, and the destination.

In another embodiment, the system and method are implemented as a component of a routing system that is used to "optimize" the efficiency of fuel consumption and/or "minimize" the emission output or travel time of the vehicle by factoring operation and physical characteristics of the vehicle and physical characteristics of the route segments. As used herein, the term "optimize" and various forms thereof is intended to mean that a characteristic, parameter, condition, output, and the like, is improved, but not necessarily maximized or minimized (although optimizing may include such maximizing or minimizing). For example, optimizing fuel efficiency or emissions generation may mean increasing the fuel efficiency of a vehicle or reducing the emissions generated by the vehicle, but not necessarily achieving the greatest possible fuel efficiency or the lowest possible emissions generated. Additionally, as used herein, the terms "maximize"

and "minimize" and various forms thereof are intended to mean that a characteristic, parameter, condition, output, and the like, is increased or decreased, respectively, but not necessarily maximized or minimized to the greatest or smallest possible value. For example, maximizing fuel efficiency or minimizing fuel consumption may mean decreasing the amount of fuel consumed by the vehicle, but not necessarily eliminating all fuel consumed by the vehicle.

By predicting the authorized route the vehicle, the computer system develops a strategy for controlling the speed of the vehicle according to the predicted route instead of reacting to the signals received from route field equipment that defines segments of the route.

DETAILED DESCRIPTION

Figure 1:
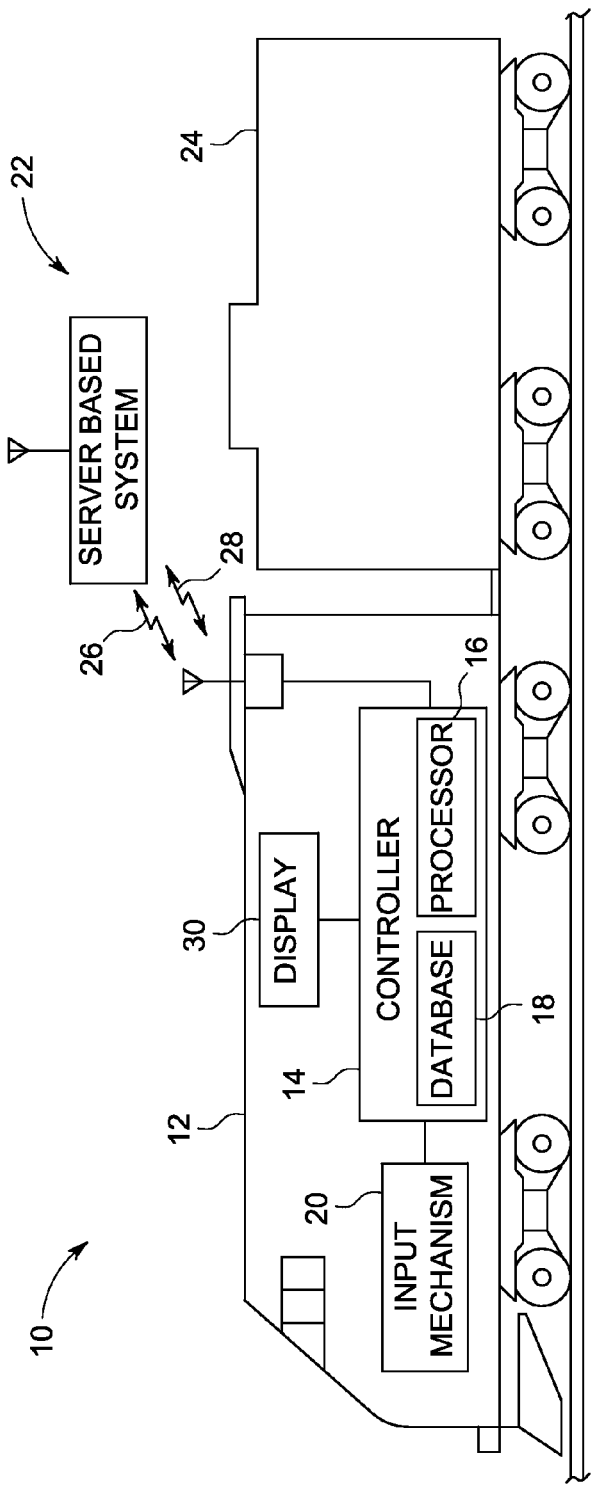
FIG. 1 is a schematic illustration of a hardware configuration for at least one embodiment of the inventive subject matter disposed onboard a powered unit of a vehicle, such as onboard a locomotive.

Before describing in detail the particular method and apparatus predicting a vehicle route in accordance with the presently described inventive subject matter, it should be observed that one or more embodiments of the inventive subject matter may reside in a novel combination of hardware and/or software elements related to the method and apparatus. Accordingly, the hardware and software elements have been represented by conventional elements in the drawings, showing only those specific details that are pertinent to one or more embodiments of the presently described inventive subject matter.

Though one or more example embodiments are described herein with respect to rail vehicles, or railway transportation systems (e.g., trains and locomotives having diesel engines or locomotives powered by electricity), one or more embodiments of the inventive subject matter are applicable for other uses or vehicles, such as, but not limited to, other off-highway vehicles, marine vessels, stationary units, agricultural vehicles, transport buses, and the like, one or more of which may use at least one engine (e.g., a diesel engine) or internal combustion engine (e.g., diesel internal combustion engine). Toward this end, when discussing a specified mission, the term "mission" may include a task or requirement to be performed by a powered system of a vehicle. Therefore, with respect to railway, marine, transport vehicles, agricultural vehicles, or off-highway vehicle applications, the term "mission" may refer to the movement of the powered system from a present location to a destination. Furthermore, though diesel powered systems are disclosed, one or more embodiments described herein may be utilized with non-diesel powered systems, such as but not limited to natural gas powered systems, bio-diesel powered systems, and the like. Furthermore, as disclosed herein, such non-diesel powered systems, as well as diesel powered systems, may include multiple engines, other power sources, and/or additional power sources, such as, but not limited to, battery sources, voltage sources (such as but not limited to capacitors), chemical sources, pressure based sources (such as but not limited to spring and/or hydraulic expansion), current sources (such as but not limited to inductors), inertial sources (such as but not limited to flywheel devices), gravitational-based power sources, and/or thermal-based power sources.

Additionally, although reference is made to an onboard processor or computer system, one or more functions of the presently described inventive subject matter may be performed by off-board computer systems that are linked to one or more vehicles in a fleet of vehicles while located off (e.g., "remote") of the vehicles.

With respect to FIG. 1, there is schematically illustrated a vehicle 10 with a powered unit 12 and a plurality of non-powered units 24. The vehicle 10 is shown as a train having a locomotive as the powered unit 12, but alternatively may be another type of rail vehicle or another type of vehicle that does not travel solely on tracks or rails. The powered unit 12 is a vehicle capable of self-propulsion (e.g., a locomotive) and the non-powered units 24 are vehicles that are not capable of self-propulsion (e.g., railcars). The vehicle 10 may also have one or more remote powered units dispersed among the non-powered units 24. The powered unit 12, such as the lead powered unit in the vehicle 10 if there also are remote powered units, is equipped with an onboard computer system 14 that has a database 18 and a processor 16 for processing data in the database 18. Additionally, the powered unit 12 may have an onboard an input mechanism 20 for entering data in the controller 14, which data is processed using data in the database to generate a predicted vehicle route. The input mechanism may also include on off-board server based system 22 that transmits data to the controller 14 to generate the predicted vehicle route.

Figure 2:
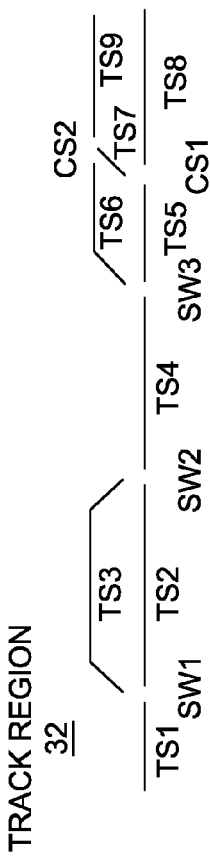
FIG. 2 is a schematic illustration of a region of a route network.

That database 18 has data stored in a memory, which data is related to a route network (e.g., a railroad track network) comprising a series of route segments (e.g., track segments) and data representative of routing rules (e.g., railroad routing rules) used by dispatchers to formulate vehicle routes. The term "dispatcher" as used in this specification and in the claims shall include not only human dispatchers but also any automated systems that perform dispatcher functions. Additionally, data representative of the location of dispatch stations along the route network or route segments may be stored in the database 18 including the identity of the different station routes for entering and exiting the station. More specifically, the route network data can include a route identifier and/or a route segment identifier for each route segment within a route. With reference to FIG. 2, there is a schematic of plurality of interconnected route segments that represent a route region 32 within a route network. A single route region may literally contain hundreds of route segments, and the simplified region shown in FIG. 2 is provided for convenience in describing one or more aspects of the presently described inventive subject matter. As illustrated, the different route segments are designated RS1, RS2, RS3, and the like. As noted above, the data in database 18 can include route identifier data. For example, a route identified as route 110 (see Table I) includes route segments RS1, RS2, RS4, RS5, and RS8. The database 18 may also include a route segment length for one or more of the route segments, which may be used to calculate the overall distance of the vehicle route.

The route network can be divided into route regions which may correspond to route subdivisions (such as railroad track subdivisions), and one or more of these regions may be assigned an identifier. For one or more of the route regions, data representative of locations of stations within a respective region may be provided or stored. Additionally, for one or more of the station locations, there can be one or more routes that a vehicle may enter and exit a station location. These entry and/or exit routes can be identified with the station locations.

The database 18 may include route segment connecting data that identifies which route segments are connected to one another and/or the ends at which the route segments are connected. For example, one or more of the route segments may include a first end and second end, which can be identified as a high end and low end, respectively. In reference to FIG. 2, the low end of each of the illustrated route segments is the left end and the high end is the right end of each route segment. Where an end of a route segment is connected to two routes, each of the two routes connected with the route segment can be categorized as a primary or secondary connecting segment. For example, with reference to FIG. 2, the route segment RS4 has a low end primary connection to route segment RS2 (at the high end of RS2) and route segment RS4 has low end secondary connection to route segment RS3 (at the high end of RS3). Additionally, route segment RS4 has a high end primary connection to route segment RS5 (at the low end of RS5) and a high end primary connection to route segment RS6 (at the low end of RS6).

In addition to the foregoing data, the database 18 may also include data representative of switches in the route network. In reference to FIG. 2, switches are identified on the route 24 as SW1, SW2, SW3, and cross switches are identified as CS1 and CS2. The database may include data pertaining to the location of one or more of the switches representative of route segments. For example, switch SW2 (in the below table the switches are referred to as divergent devices) is located at the high end of route segments RS2 and RS3, and at the low end of the route segment RS4.

The database 18 may include data that is representative of routing rules. Such routing rules may include rules pertaining to a preferred or designated direction of travel by vehicles on one or more of the route segments. With respect to direction of travel, designations are assigned to the directions that indicate a direction in which there may be some cost benefit or a constraint. For example, the designation NEUTRAL can mean that the route or route segment may be traveled in either direction, or there is no benefit or constraint on travel in either direction. A designation of HIGHBOUND can mean that the designated or limited direction of travel is entering the route segment from a low end of the route segment and traveling toward the high end of the route segment. A designation of LOWBOUND can mean that the designated or limited direction is entering the route segment from a high end of the route segment and traveling toward the low end of the route segment. For example, in the below referenced table, the route segment RS6 has a designated direction of LOWBOUND which means, in reference to FIG. 2, that the designated or limited direction of travel is from right to left on the route segment RS6. A designation of AVOID can mean that the route segment should be avoided if at all possible. This may be appropriate for siding routes in a route network, such as siding rails in a track network.

The database 18 may include weight restrictions of vehicles, such as non-powered units, representative of one or more of the route segments in the route network. The database 18 may include data representative of restrictions on the length of a vehicle, restrictions on the width (or other size) of the vehicle (e.g., the powered units and/or non-powered units), or restrictions on the type of cargo (e.g., hazardous materials) representative of one or more of the route segments in the route network. These restrictions may prohibit or limit the travel of some vehicles over associated route segments.

The above referenced data representative of route segments and switching equipment for the route segments shown in FIG. 2 are set forth in the below table:

TABLE I

| | Route Segment ID | | | | | | | | |
|---|---|---|---|---|---|---|---|---|---|
| | RS1 | RS2 | RS3 | RS4 | RS5 | RS6 | RS7 | RS8 | RS9 |
| Route ID | 110 | 110 | 111 | 110 | 110 | 112 | 113 | 110 | 112 |
| Segment Length | 14,695 | 12,786 | 12,347 | 19,808 | 22,264 | 22,743 | 550 | | |
| HighEnd Primary Connecting Segment | RS2 | RS4 | RS4 | RS5 | RS8 | RS9 | RS9 | 0 | 0 |
| HighEnd Secondary Connecting Segment | RS3 | 0 | 0 | RS6 | RS7 | 0 | 0 | 0 | 0 |
| HighEnd Divergent Device | SW1 | SW2 | SW2 | SW3 | CS1 | CS2 | CS2 | 0 | 0 |
| LowEnd Primary Connecting Segment | 0 | RS1 | RS1 | RS2 | RS4 | RS4 | RS5 | RS5 | RS6 |
| LowEnd Secondary Connecting Segment | 0 | 0 | 0 | RS3 | 0 | 0 | 0 | 0 | RS7 |
| LowEnd Divergent Device | 0 | SW1 | SW1 | SW2 | SW3 | SW3 | CS1 | CS1 | CS2 |
| Designated Direction | NEUTRAL | NEUTRAL | AVOID | NEUTRAL | HIGHBOUND | LOWBOUND | NEUTRAL | | |

Figure 3:
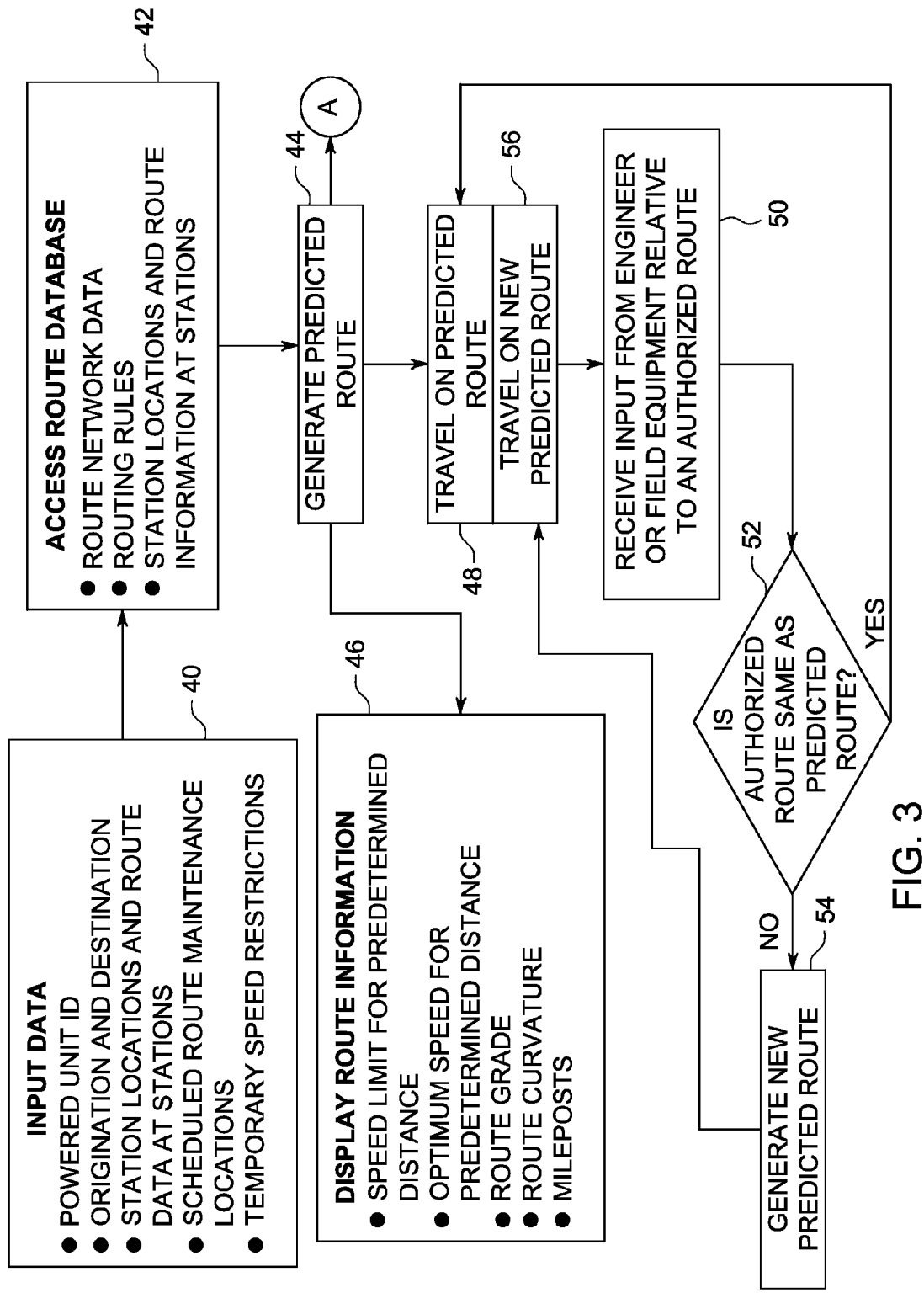
FIG. 3 is a flow chart of a method for practicing one or more embodiments of the inventive subject matter described herein.

With reference to FIGS. 1, 2 and 3, and the above-referenced Table I, there is now described a method for predicting a vehicle route. In FIG. 3, one embodiment of a flow chart for the method is illustrated. At 40, data representative of identification of the powered unit 12 and/or the vehicle 10 origination (or origin) and destination locations for a vehicle route are input into the onboard controller 14. Alternatively, the data may represent one or more intermediate locations (e.g., disposed between the origin and destination locations). Additionally, data representative of speed restrictions temporary speed restrictions) and/or data representative of scheduled route maintenance for one or more of the route segments between the origin to the destination are input into the onboard controller 14. The data may be entered via the input mechanism 20 and/or the off-board server based system 22. In the case when an engineer or operator of the vehicle is preparing to travel on a route network, the engineer or operator can input an identification number of the vehicle or powered unit, and this information can be transmitted via signal 26 (shown in FIG. 1) to the server-based system 22, which then transmits the data representative of the origination location and/or destination location of the vehicle 10 via a signal 28 (shown in FIG. 1). As described above, the data representative of speed restrictions and/or scheduled route maintenance may also be included in this transmission.

At 42, when at least some of the above described data is entered the processor accesses the database 18 that includes the route network data, routing data or rules, and the station location information. Using the input data (step 40) entered at 42, at 44, the processor 16 generates a predicted vehicle route based on the origination and destination locations for the vehicle and/or powered unit 12. The controller 14 and/or processor 16 may utilize known software for developing train routes at dispatch stations. Routing through the network of route segments may be computed using one or more network routing algorithms, such as the well known Shortest Path First algorithm.

By way of first example, and in reference to FIG. 2 and Table I, an origination location of route segment RS1 and a destination location of route segment RS8 is entered in controller 14. The display 30, assuming there are no scheduled route maintenances, can show a predicted route from RS1 to RS2 to RS4 to RS5 to RS8. As shown in the Table I, the primary connecting route segment to RS1 is RS2, the primary connecting segment to RS2 is RS4 which also has a preferred direction of travel of NEUTRAL. So the vehicle can travel on RS1, RS2 and RS4 to RS5. The route segment RS5 has a designated direction of travel of HIGHBOUND so the vehicle can travel on RS5 to RS8 its destination.

In a second example, an origination location of RS9 and destination location of RS1 are entered in the controller 14. In reference to Table I, the route segment RS9 has a designated direction of travel in the LOWBOUND (e.g., right to left) direction. As shown in FIG. 2, both route segment RS6 and route segment RS7 are connected to the route segment RS9; however, the route segment RS6 has a designated direction of travel of LOWBOUND, which is selected over the NEUTRAL direction of the route segment RS7. The vehicle can then travel the connecting routes of RS4, RS2 and RS1 because of the NEUTRAL designated direction of travel of those route segments.

The system may include in the database 18, or in a separate accessible database, a list of previously predicted routes that a vehicle 10 has traveled so that, when the identification of the powered unit 12 and/or vehicle 10 with the origination and destination locations is made, the algorithm may match the powered unit 12 and/or the vehicle 10 with one or more of the previously predicted routes. When a previous predicted route is identified, a new predicted route may be generated using some or all of the previously predicted route as an initial route (or as a portion of the new predicted route), while factoring in updated restrictions such as temporary speed restrictions or route maintenance schedules. In this manner, the algorithm can be configured to reduce the amount of time required for the processor to generate a predicted route. In one embodiment, the previously predicted routes may be limited to those routes having been predicted within a predetermined time period (e.g., routes predicted within the past five days).

Figure 4:
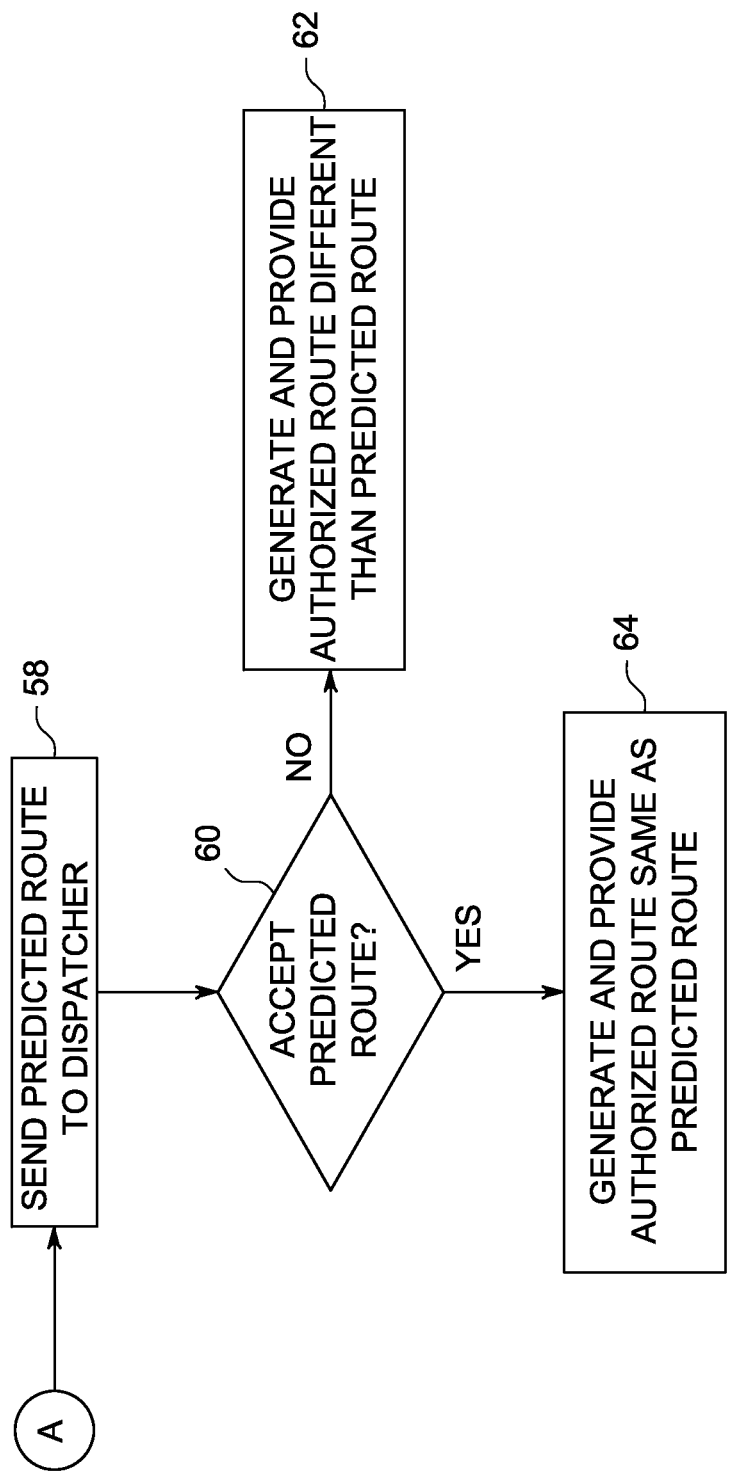
FIG. 4 is a flow chart continued from the flow chart shown in FIG. 3.

With respect to FIG. 4, in one embodiment, at 58, the predicted route may be sent from the powered unit 12 to the dispatcher. At 60, the dispatcher has the option to accept or reject the predicted route. If the dispatcher chooses not to accept the predicted route, the dispatcher can generate and provide an authorized route that is different than the predicted route at 62. Alternatively, at 64, the dispatcher may accept the predicted route and provide an authorized route that is the same as the predicted route. If necessary, the dispatcher may remotely activate switches according to the authorized predicted route so the vehicle can travel along the authorized predicted route. This embodiment may be effective for route networks experiencing light vehicle traffic, or it may be effective for such off highway route networks, such as shipping routes, that do not experience heavier traffic loads as in busier route networks.

One or more embodiments described herein may be configured as a component of a trip optimization or trip planner system or computer program that is used, for example, to improve or optimize fuel efficiency of the vehicle and/or reduce or minimize emissions output for a trip, as described in the above cross-referenced patent applications. One or more controllers may be configured to implement the trip planner system so that, when the predicted route is generated, the trip planner system generates a trip plan for all or a portion of the route. The trip plan may include operational settings (e.g., throttle positions, brake settings, speeds, power outputs, and the like) for the vehicle that are expressed as a function of at least one of time and/or distance along the trip. Traveling according to the trip plan may reduce the amount of fuel consumed, emissions generated by the vehicle, and/or travel time relative to traveling to one or more other plans.

Returning to the description of one embodiment of the method described herein, at 56, the controller 16 generates a trip plan (e.g., a throttle position strategy) that is computed using a trip optimization algorithm or a trip planning algorithm. Such an algorithm can factor in variables such as route grade, curvatures, and/or elevations to generate the trip plan that reduces fuel consumed and/or emissions generated by the vehicle. Additionally, characteristic data may be entered via the off board server-based system 22. This data may include the physical and performance data on one or more powered units, types or categories of the powered units and/or non-powered units, weights of the powered units and/or non-powered units, lengths of the powered units and/or non-powered units, cross sectional areas of the powered units and/or non-powered units, horsepower generated by the powered units, and/or other characteristics that may be considered in increasing fuel efficiency and/or reducing emissions generation. The vehicles may also be defined in the database with an identifier, speed limits or restrictions, and/or lists of powered unit types and/or non-powered unit types that may be included in the vehicles. In this manner, a trip plan for the vehicle route can be generated that provides one or more operational settings for one or more route segment and/or for defined distances over the route.

Again with reference to the route network data and as noted above, the route network data can be divided into regions, with one or more of the regions being a defined geographic entity of the route network. One or more of these regions may correspond to a vehicle subdivision, such as a railroad subdivision. To the extent that a vehicle route may cover more than one region of a route network, the predicted vehicle route may comprise a route for each of the regions covered in the vehicle route.

At 46, the controller may present (e.g., visually display) track information for a defined region within the predicted vehicle route on the display 30. The display 30 may present a speed limit for a predetermined distance on the predicted route, a designated operational setting (e.g., a designated speed limit) for a predetermined distance on the predicted route and that may be based on the trip plan described above, route grade and/or curvature information, and/or milepost or other landmark information In one embodiment of the inventive subject matter described herein, the system and method are able to dynamically adapt the predicted route in the event the vehicle 10 diverges from the predicted route. At 50, the vehicle receives signals or input data relating to the authorized route from field equipment such as switches. These signals or input can identify the location of the vehicle 10 on the authorized route and/or identify where (e.g., which route segments) that the vehicle will be traveling over some predetermined distance In the above first example of a predicted vehicle route, there is a switch SW1 connected to a high end of the route segment RS1 and a low end of the route segment RS3. The predicted vehicle route has the vehicle 10 travel on the route segment RS1 and then the route segment RS2. During the course of traveling on an authorized route, however, the vehicle 10 may receive a signal indicating that the switch SW1 is connecting the route segment RS1 to the route segment RS3, instead of to the route segment RS2. As the switch SW1 is not connected to the route segment RS2 (or the route segment RS3 is not part of the predicted route), at 52, the processor 16 identifies the divergence of route segment RS3 and, at 54, generates a new predicted route using the present location of the vehicle 10 and/or the track segment RS3 as the origination location to adapt the predicted route to include the track segment RS3. For example, the track segment RS3 may have different associated speed restrictions that cause the vehicle to reduce speed, or fewer constraints on speed that allow the vehicle 10 to increase speed. Additionally, the trip planner system can update the trip plan (e.g., throttle position strategy) for the new predicted vehicle route.

In another embodiment, the algorithm may be configured to reduce the time necessary to generate the new route when there is a divergence of the original predicted route. For example, if the vehicle 10 or computer system on the vehicle 10 determines that the vehicle 10 has or will diverge from the predicted route, the algorithm may be configured to identify the point at which the divergent route intersects the predicted route. In this manner, the algorithm may take the remaining segments in the predicted and simply copy the remaining route for generating the new route, instead of regenerating that remaining portion of the route.

While one or more embodiments of the inventive subject matter have been shown and described herein, these embodiments are provided by way of example and not of limitation on each and every embodiment. Numerous variations, changes and substitutions will occur to those of ordinary skill in the art without departing from the teaching of the presently described inventive subject matter. Accordingly, it is intended that the inventive subject matter be interpreted within the full spirit and scope of the appended claims.

What is claimed is:

1. A system comprising:
an input mechanism configured to be disposed onboard a powered vehicle and for receiving, from an off-board system disposed off of the vehicle, a designated location for the vehicle to travel toward in a route network; and
a controller configured to be disposed onboard the vehicle and to receive the designated location from the input mechanism, the controller including a memory that is configured to store routing rules that restrict travel of the vehicle on one or more route segments of the route network,
wherein the controller is configured to generate a predicted vehicle route for the vehicle to travel along toward the designated location based on the designated location received from the input mechanism, the controller also configured to send the predicted vehicle route to a dispatcher disposed off-board the vehicle for acceptance or rejection by the dispatcher, the controller further configured to receive, from the dispatcher, a first authorized route that is same as the predicted vehicle route when the dispatcher accepts the predicted vehicle route or receive, from the dispatcher, a second authorized route that is different from the predicted vehicle route when the dispatcher rejects the predicted route, the controller also configured to generate an alternate route for the vehicle to travel along toward the designated location when actual travel of the vehicle deviates from the first authorized route or the second authorized route, the alternate route being based on the routing rules and generated by the controller as the vehicle moves in the route network.

2. The system of claim 1 wherein the routing rules include at least one of locations or positions of switches that couple two or more route segments.

3. The system of claim 1 wherein the routing rules include a weight restriction associated with one or more of the route segments, the weight restriction indicating a limit on a weight of the vehicle traveling over the one or more route segments.

4. The system of claim 1 wherein the input mechanism is configured to be coupled with the controller such that the controller receives the designated location from the input mechanism.

5. The system of claim 1 wherein the route network includes one or more switches that couple two or more route segments, and the controller is configured to communicate the alternate route to an off-board system so that the off-board system can control positions of the switches to permit the rail vehicle to travel along the alternate route.

6. The system of claim 1 wherein the routing rules include one or more speed restrictions or route maintenance schedules for one or more of the route segments.

7. The system of claim 1 wherein the controller is configured to identify the route segments over which the vehicle is to travel in the alternate route in order to travel toward the designated location.

8. The system of claim 1 wherein the controller is configured to provide one or more recommended speeds to travel on the alternate route to an operator on the vehicle.

9. The system of claim 1 wherein the controller is configured to generate the alternate route when the vehicle diverges or will diverge from one or more route segments on the first authorized route or the second authorized route to an off-route segment, and wherein the alternate route is generated by connecting a current location of the vehicle to one or more of the route segments that interconnect the current location with the designated location.

10. The system of claim 1 wherein input mechanism also is configured to receive a designated route for the vehicle to travel along toward the designated location from the off-board system, and wherein the alternate route includes a first route segment that intersects a second route segment of the designated route and a remaining portion of the designated route includes one or more common route segments as the alternate route, further wherein the controller is configured to copy the remaining portion of the designated route from the intersection toward the designated location to generate the alternate route.

11. The system of claim 1 wherein the controller is configured to obtain data relative to one or more previously generated routes associated with the designated location and to select at least one of the previously generated routes as the alternate route.

12. The system of claim 1 wherein the controller is configured to provide at least one of recommended speeds or throttle positions of the vehicle when following the alternate route, the at least one of recommended speeds or throttle positions determined in order to reduce at least one of fuel consumption, travel time, or emissions output of the vehicle as the vehicle travels toward the designated location according to the alternate route relative to traveling toward the designated location using other recommended speeds or throttle positions.

13. The system of claim 1 wherein the controller is configured to obtain data representative of one or more speed restrictions or scheduled maintenance for one or more of the route segments, the controller further configured to generate the alternate route based on the one or more speed restrictions or scheduled maintenance.

14. The system of claim 1 wherein the controller is configured to transmit the alternate route to the off-board system for acceptance or rejection of the alternate route as an authorized route for the vehicle to travel on in the route network.

15. The system of claim 1 wherein the vehicle is a rail vehicle configured to travel over tracks of the route network, and the controller is configured to at least one of store or obtain at least one of track network data or the routing rules that are representative of restrictions of one or more route segments of the tracks in the route network.

16. The system of claim 15 wherein the track network data includes at least one of identifiers assigned to the route segments, identifiers of which route segments are connected to other route segments, a length of one or more of the route segments, a location of one or more switches in the route network relative to route segments, or a recommended direction of travel over one or more of the route segments.

17. The system of claim 15 wherein the track network data comprises at least one of a location of one or more rail vehicle stations in the route network or a location one or more route segments that provide an entrance into or an exit out of the one or more rail vehicle stations.

18. The system of claim 15 wherein the track network data comprises at least one of a physical characteristic of the rail vehicle or cargo on the rail vehicle.

19. The system of claim 15 wherein the route network includes track field equipment that is configured to be activated to control which of the route segments are able to be traversed by the rail vehicle, and the controller is configured to transmit the alternate route to the off-board system for coordination with the field equipment to allow the vehicle to travel along the alternate route.

20. A method comprising:
obtaining a designated location for a powered vehicle to travel toward in a route network and routing rules that provide restrictions on travel by the vehicle over one or more route segments in the route network, the designated location being received from an off-board system;
generating a predicted route for the vehicle to travel along toward the designated location based on the designated location, the predicted route generated onboard the vehicle;
sending the predicted route to a dispatcher disposed off-board of the vehicle for acceptance or rejection by the dispatcher;
receiving, from the dispatcher, a first authorized route that is same as the predicted vehicle route when the dispatcher accepts the predicted vehicle route or a second authorized route that is different from the predicted vehicle route when the dispatcher rejects the predicted route;
monitoring actual travel of the vehicle in the route network along the first authorized route or the second authorized route; and
generating an alternate route for the vehicle to travel along toward the designated location when the actual travel of the vehicle deviates from the first authorized route or the second authorized route, the alternate route generated onboard the vehicle and based on the routing rules as the vehicle moves in the route network.

21. The method of claim 20 wherein the routing rules include at least one of locations or positions of switches that couple two or more route segments or a size restriction associated with one or more of the route segments, and the alternate route is generated based on the routing rules.

22. The method of claim 20 wherein the route network includes one or more switches that couple two or more route segments, and further comprising communicating the alternate route to an off-board system that controls positions of the switches to permit the vehicle to travel along the alternate route.

23. The method of claim 20 further comprising receiving a designated route for the vehicle to travel along toward the designated location from the off-board system, wherein generating the alternate route includes changing the designated route to the alternate route when the vehicle diverges or will diverge from one or more route segments on the designated route to an off-route segment, and wherein the alternate route is generated by connecting a current location of the vehicle to one or more route segments that interconnect the current location with the designated location.

24. The method of claim 23 wherein the alternate route includes a first route segment that intersects a second route segment of the designated route, and a remaining portion of the designated route includes one or more of the same route segments as the alternate route, and wherein generating the alternate route includes copying the remaining portion of the designated route from an intersection between the first route segment and the second route segment to generate the alternate route.

25. The method of claim 20 wherein generating the alternate route includes accessing one or more previously generated designated routes associated with the designated location and selecting at least one of the one or more previously generated designated routes as the alternate route.

26. The method of claim 20 further comprising transmitting the alternate route to an off-board system for acceptance or rejection of the alternate route as an authorized route for the vehicle to travel on in the route network.

* * * * *